Aug. 27, 1968   C. GALLOTTI   3,398,613
APPARATUS FOR REMOVING EXCESS WELDING MATERIAL FROM RAIL WELDS
Filed Feb. 4, 1966
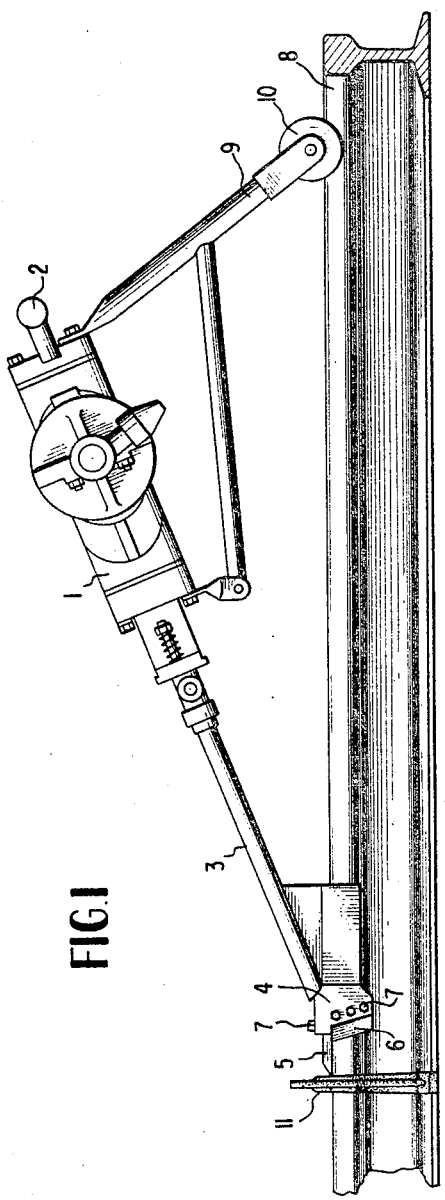
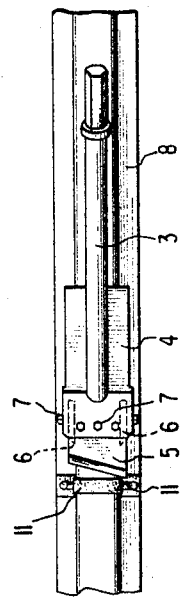
INVENTOR
CARLO GALLOTTI
BY *James E. Bryan*
ATTORNEY ounited States Patent Office 3,398,613
Patented Aug. 27, 1968

3,398,613
APPARATUS FOR REMOVING EXCESS WELDING MATERIAL FROM RAIL WELDS
Carlo Gallotti, Milan, Italy, assignor to Elektro-Thermit G.m.b.H., Essen, Germany, a corporation of limited liability of Germany
Filed Feb. 4, 1966, Ser. No. 525,030
7 Claims. (Cl. 83—3)

ABSTRACT OF THE DISCLOSURE

A downwardly facing channel-shaped guide slide is adapted to enclose a rail tread. Chisels are supported by the guide slide and have cutting edges which are mounted at an angle with respect to the excess welding material to be removed. A chisel shaft is connected at one end to the guide slide and extends upwardly therefrom at an angle thereto and has hammer means connected to the opposite end thereof. A support means is connected to the hammer means and extends downwardly therefrom. A guide means is carried by the lower end of the support means for movable engagement with a rail to guide movement of the apparatus along the upper surface of a rail tread.

In the welding of rails, excess welding material, or weld metal, is produced due to the process techniques employed, which excess must be removed immediately after welding so that the welded area may be traversed by a train as soon as possible. After cooling the welded area, a finishing treatment thereof is required in order that the welded area is true to profile, this treatment generally being effected by grinding.

In the modern process for the aluminothermic welding of rails, which requires a particularly short time for the performance thereof, difficulties are still created, particularly with regard to the effort required and the time required to remove the excess welding material. It is known to manually remove the excess welding material with a hammer and chisel, after removal of the casting mold, the excess material being removed while in the red-hot condition. This operation, however, requires considerable physical effort as well as time. In the interest of a more rapid removal operation, it has been attempted to autogenously separate the excess material. This is possible, however, only after a previous and very careful removal of any adhering molding sand residues since, otherwise, the cutting tool is deflected and the rail is damaged. This process also requires a high degree of skill on the part of the workman. The excess material also has been chiseled off, while in the red-hot condition, using compressed air-actuated chipping hammers. This technique requires the transportation of heavy compressed air cylinders or bulky compressors and great care must be exercised in the performance of the technique since inaccurate operation of the chisel results in damage to the rail.

Further difficulties arise in that, after removal of the excess material above the rail tread, the excess material at the sides of the rail tread and at the rail web and base has cooled to such an extent that the removal thereof is extremely difficult, since the rate at which the excess material can be removed depends upon the manual skill of the workman.

The present invention provides apparatus for removing such excess material which eliminates the above disadvantages and makes the true to profile removal of the excess material independent of the skill of the workman, while considerably reducing the time required, and increasing the accuracy of the operation.

In the present invention, excess welding material is removed true to profile using a motor, or compressed air, or mechanically-actuated chisel hammer which latter is guided by the rail. The guide of the chisel hammer comprises a slide enclosing the rail tread, which slide is connected with the chisel shaft and is mounted at an angle with respect thereto. The apparatus also includes a support secured to the hammer and guided on the rail. The slide simultaneously acts as a chisel support or holder, and preferably has a plurality of exchangeable chisels, the cutting edges of which are mounted at an angle with regard to the excess welding material or work to be removed. The chisels for removing the excess welding material at the rail tread and/or for removing the excess material at the rail web and base may be supported on one chisel support and the individual chisels advantageously are mounted in a staggered fashion, i.e., set back in a manner such that the edges of the individual chisels engage the work successively, either individually or in pairs. The angle which is formed by the side edge of one chisel and the cutting edge of an adjacent chisel, being set back with regard thereto, may be either acute or obtuse.

In a preferred embodiment of the apparatus of the invention, the support which is connected with the hammer includes, at one end thereof, a guide provided with flanges or a sliding means adapted to be guided by the rail.

For removing excess welding material only at the rail tread, the chisel holder is provided with chisels which enclose the rail tread only at the top and at the sides thereof in a manner true to profile.

The angular arrangement of the cutting edges and the mounting of the chisels is of particular importance. As a result thereof, the removal of the excess welding material is accomplished in a single operation and the staggered mounting of the cutting edges makes possible a reduction of the driving force so that the driving means, such as an air compressor or motor which actuates the chisel hammer either directly or indirectly, e.g. by means of a flexible shaft, may be maintained small and light, which is particularly desirable for operation of the apparatus on a construction site.

The invention will be further illustrated by reference to the accompanying drawings in which:

FIGURE 1 shows one embodiment of the chisel hammer of the invention being guided on a rail in the working position, and FIGURE 2 is a top view of the chisel of FIGURE 1 with the chisel hammer removed.

As shown in FIGURES 1 and 2, the working tool is inserted into the chisel hammer 1, which latter is provided with the handle 2. The working tool comprises the chisel shaft 3 and the guide slide 4, which also acts as a chisel holder for the removable chisels 5 and 6 which are secured to the slide by the machine screws 7. Secured to the other end of the chisel hammer 1 is a support 9 which is guided on the rail 8 by a double-flanged guide 10. Reference numeral 11 identifies the excess steel material which is to be removed. The chisels 5 and 6 are so mounted that the excess material above the rail tread is removed first, by the chisel 5, and then the chisels 6 engage the excess material on both sides of the rail tread simultaneously, for removal of such excess material.

Obtuse angles are formed between the cutting edges of the chisels 6 and the sides of the chisel 5. The cutting edges of the chisels 6, however, also may be mounted in a manner such that they enclose an acute angle with the side edges of the chisel 5.

The removal of the excess material at the rail tread is effected in one working operation and is completely independent of the dexterity of the workman whose only function consists of holding the chisel hammer at the handle 2. The drive of the hammer may be effected in any desired manner, such as pneumatically for example.

It will be obvious to those skilled in the art that many modifications may be made within the scope of the present invention wtihout departing from the spirit thereof, and the invention includes all such modifications.

What is claimed is:

1. Apparatus for removing excess welding material from a rail weld comprising downwardly facing guide slide means for enclosing a rail tread, cutting means carried by the guide slide means, a chisel shaft connected at one end thereof with said guide slide means and extending upwardly therefrom at an angle thereto, hammer means operatively connected to the opposite end of said shaft, support means connected to said hammer means and extending downwardly therefrom, and guide means carried by said support means for movable engagement with a rail tread for guiding movement of the apparatus along the upper surface of a rail tread.

2. An apparatus according to claim 1 wherein said guide slide means is channel-shaped, said chisel shaft being connected at one end thereof with the connecting web of the channel-shaped guide slide means.

3. An apparatus according to claim 1 wherein the guide slide means is channel-shaped and has cutting means carried on three sides thereof.

4. An apparatus according to claim 3 wherein the cutting means includes cutting edges, said cutting edges being disposed at an angle with respect to the work.

5. An apparatus according to claim 3 wherein at least one of said cutting means is staggered with respect to another of said cutting means so that said one cutting means engages the work prior to said other of said cutting means.

6. An apparatus according to claim 3 wherein the cutting means on the channel connecting web is staggered with respect to the cutting means on the channel sides so that the cutting means on the channel connecting web engages the work before the cutting means on the channel sides.

7. An apparatus according to claim 6 wherein the cutting means on the channel connecting web has a cutting edge disposed at an angle with respect to the work.

References Cited

UNITED STATES PATENTS 2,124,849   7/1938   Drain _____ 90—24 X

FOREIGN PATENTS 992,789   5/1965   Great Britain.
1,374,279   8/1964   France.

ANDREW R. JUHASZ, *Primary Examiner.*